United States Patent
Michel et al.

(10) Patent No.: US 7,082,565 B1
(45) Date of Patent: Jul. 25, 2006

(54) METHOD FOR MATCHING THE BIT RATE IN A COMMUNICATION DEVICE, AND A CORRESPONDING COMMUNICATION DEVICE

(75) Inventors: Juergen Michel, Munich (DE); Bernhard Raaf, Munich (DE)

(73) Assignee: Siemens Aktiengesellschanft, Munich (DE)

( * ) Notice: Subject to any disclaimer, the term of this patent is extended or adjusted under 35 U.S.C. 154(b) by 191 days.

(21) Appl. No.: 10/130,965

(22) PCT Filed: Nov. 22, 2000

(86) PCT No.: PCT/DE00/04125

§ 371 (c)(1),
(2), (4) Date: Sep. 25, 2002

(87) PCT Pub. No.: WO01/39422

PCT Pub. Date: May 31, 2001

(30) Foreign Application Priority Data

Nov. 25, 1999 (DE) ............................... 199 56 749
May 19, 2000 (DE) ............................... 100 24 784

(51) Int. Cl.
*H03M 13/03* (2006.01)

(52) U.S. Cl. .................. 714/790; 714/704; 714/774

(58) Field of Classification Search ................ 714/748, 714/751, 792, 786, 790, 704, 774; 455/67; 370/342, 320, 336; 375/265
See application file for complete search history.

(56) References Cited

U.S. PATENT DOCUMENTS

| | | | |
|---|---|---|---|
| 5,416,787 A | 5/1995 | Kodama et al. | |
| 5,436,918 A * | 7/1995 | Kato et al. | 714/795 |
| 5,878,085 A * | 3/1999 | McCallister et al. | 375/280 |
| 5,944,849 A * | 8/1999 | Sonetaka | 714/786 |
| 6,052,385 A * | 4/2000 | Kanerva et al. | 370/465 |
| 6,081,921 A * | 6/2000 | Simanapalli | 714/786 |
| 6,137,779 A * | 10/2000 | Miller et al. | 370/236 |
| 6,141,353 A * | 10/2000 | Li | 370/465 |
| 6,307,867 B1 * | 10/2001 | Roobol et al. | 370/470 |
| 6,363,058 B1 * | 3/2002 | Roobol et al. | 370/310 |
| 6,397,367 B1 * | 5/2002 | Park et al. | 714/786 |
| 6,473,442 B1 * | 10/2002 | Lundsjo et al. | 370/537 |
| 6,622,281 B1 * | 9/2003 | Yun et al. | 714/790 |
| 6,675,016 B1 * | 1/2004 | Lucidarme et al. | 455/452.2 |

FOREIGN PATENT DOCUMENTS

EP 0 912 009 4/1999
WO WO 00/21234 4/2000

* cited by examiner

*Primary Examiner*—Albert Decady
*Assistant Examiner*—Mujtaba K. Chaudry
(74) *Attorney, Agent, or Firm*—Bell, Boyd & Lloyd LLC

(57) ABSTRACT

In order to match the bit rate in a communication device, the bits of a bit stream are punctured or repeated, in which case for each bit an updated error value is calculated on the basis of a previously determined error value and an update parameter and a judgment is made on the basis of the updated error value as to whether the corresponding bit is to be punctured or repeated or not. A variable, bit-specific update parameter is used to determine the updated error value of each bit, such that it is possible to achieve a non-uniform puncturing/repetition density.

18 Claims, 3 Drawing Sheets

FIG 2A
(Prior Art)

(1)    $e = e_{ini}$ (2)    $m = 1$ (3)    do while m <= N (4)        $e = e - e_{minus}(x_m)$ (5)        if e <= 0 then (6)            Punctured bit $x_m$ (7)            $e = e + e_{plus}(x_m)$ end if (8)        $m = m + 1$ end do

FIG 2B (1)    $e = e_{ini}$ (2)    $m = 1$ (3)    do while m <= N (4)        $e = e - e_{minus}(x_m)$ (5)        do while e <= 0 then (6)            Repeat bit $x_m$ (7)            $e = e + e_{plus}(x_m)$ end do (8)        $m = m + 1$ end do

FIG 3

(1)     $e = e_{ini}$ (2)     $m = 1$ (3)     do while $m <= N$ (4)        $e = e - e_{minus}(x_m)$ (5)        do while $e <= 0$ then (6)           Select bit $x_m$ for transmission from (7)           $e = e + e_{plus}(x_m)$ end do (8)     $m = m + 1$ end do

METHOD FOR MATCHING THE BIT RATE IN A COMMUNICATION DEVICE, AND A CORRESPONDING COMMUNICATION DEVICE

BACKGROUND OF THE INVENTION

Mobile radio technology is experiencing rapid development. Work is presently proceeding on standardizing what is called the UMTS mobile radio standard ("Universal Mobile Telecommunication System") for mobile radio sets of the third mobile radio generation.

In order to match the bit rate to the transmission rate respectively possible, rate matching is carried out in the transmitter, in which case either bits are removed from the bit stream or multiplied, in particular doubled, in the bit stream. The removal of bits is denoted as "puncturing" and the multiplication as "repetition".

It is generally ensured when puncturing or repeating that the bits are punctured or repeated as uniformly as possible. Known for this purpose are algorithms in the case of which the bits of a bit stream are combined to form frames, and there is determined in each case for the bits of the individual frames an updated error value that constitutes a measure of the deviation between the instantaneous puncturing or repetition rate and the desired puncturing or repetition rate. It is then decided as a function of this updated error value whether the corresponding bit is to be punctured or repeated.

The calculation of the updated error value is performed in this case as a function of an error value, calculated for a preceding bit, and constant update parameters.

However, a non-uniform distribution of the punctured or repeated bits also can be of interest for specific applications.

Thus, for example, it can be desirable to transmit specific bit ranges (termed "Class A Bits") with a better quality than other bit ranges (so-called "Class B Bits" or "Class C Bits"). This is of particular relevance for speech transmission. This problem was solved for AMR coders ("Adaptive MultiRate" coders) in GSM ("Global System for Mobile Communications") systems by heuristically determining a puncturing pattern that provided for the range of class A bits a stronger puncturing than for the ranges of class B or class C bits. However, there are two reasons why this procedure cannot be applied to UMTS systems. Firstly, in the case of UMTS systems, the total number of bits to be punctured or the total number of bits to be transmitted is not fixed a priori, but depends on the totality of the services to be transmitted. Secondly, the puncturing, at least in the case of an uplink connection and in the TDD ("Time Division Duplex") mode, always must be carried out after a first interleaving operation, with the bits in all frames needing to be punctured uniformly.

A further application for a non-uniform puncturing is what is called "tail puncturing". If, as is generally customary, convolution coding is applied for channel coding, the bits at the start and at the end of a frame are more effectively protected against transmission errors than the bits present in the middle frame region. However, this is, in part, not required at all.

A more uniform error distribution, and thus an overall better transmission performance, then can be achieved by a stronger puncturing in the edge regions of the frame.

It is, therefore, an object of the present invention to propose a method for matching the bit rate, and a corresponding communication device, a non-uniform distribution of the punctured or repeated bits being possible with the smallest possible outlay.

SUMMARY OF THE INVENTION

Thus, according to the present invention, bit-specific and, thus, variable update parameters are used to determine the updated error values, and so a non-uniform puncturing or repetition can be achieved via appropriate selection of the update parameters. In particular, the puncturing or repetition rate can be controlled specifically.

Moreover, a special algorithm is presented that permits both puncturing and repetition within one and the same frame.

The present invention is suitable, in particular, for matching the bit rate in (UMTS) mobile radio systems, this relating both to the range of the mobile radio transmitter and to that of the mobile radio receiver, which is configured to receive a bit stream processed according to the present invention. However, the present invention is not limited to this application range, but can be applied generally overall wherever the data rate of a bit stream is to be matched.

Additional features and advantages of the present invention are described in, and will be apparent from, the following Detailed Description of the Invention and the Figures.

BRIEF DESCRIPTION OF THE FIGURES

FIG. 2A shows a possible algorithm that can be used by a bit rate matching device shown in FIG. 1 for the purpose of puncturing a bit stream.

FIG. 2B shows a possible algorithm that can be used by the bit rate matching device shown in FIG. 1 for the purpose of repeating a bit stream.

FIG. 3 shows a further possible algorithm that can be used by the bit rate matching device shown in FIG. 1 for the purpose of puncturing and repeating a bit stream.

DETAILED DESCRIPTION OF THE INVENTION

Figure 1:
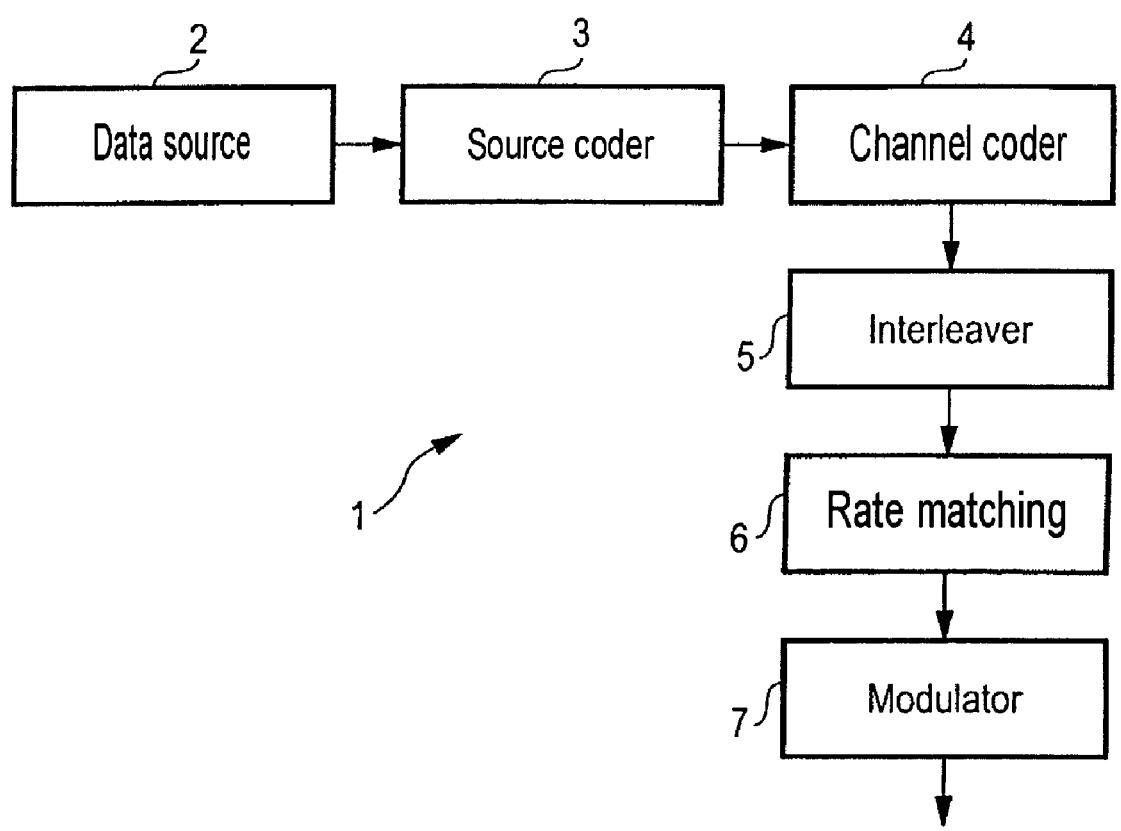
FIG. 1 shows a simplified block diagram of a mobile radio transmitter according to the present invention.

FIG. 1 illustrates schematically the design of a mobile radio transmitter 1 according to the present invention, which transmits data or communication information, in particular speech information, via a radio-frequency transmission channel to a receiver. The information supplied from a data source 2, for example a microphone, is firstly converted into a bit sequence with the aid of a digital source coder 3. The coded data are subsequently coded with the aid of a channel coder 4, the actual useful or message bits being redundantly coded, as a result of which transmission errors can be detected and subsequently corrected. What are termed block codes or convolution codes are normally used for channel coding. The use of convolution codes is proposed in accordance with the current version of UMTS standardization. A substantial difference from block codes consists in that in the case of convolution codes it is not that individual data blocks are coded sequentially, but that there is continuous processing, with each current code word of an input sequence to be coded also being a function of the preceding input sequences.

Before being transmitted to the receiver, the channel-coded information is usually supplied to an interleaver 5 that divides the bits to be transmitted over a number of interleaving frames in accordance with a specific scheme, as a result of which the errors, generally occurring in bundles, are distributed in order to obtain what is termed a memoryless transmission channel with a quasi-random error distribution. The information or data coded in this way is/are supplied to a modulator 7 whose task is to modulate the data onto a carrier signal and transmit them to a receiver via a radio-frequency transmission channel in accordance with a prescribed multiple access method. In order to match the bit rate of the coded data stream to the respectively possible transmission rate, a rate matching is carried out upstream of the modulator 7 with the aid of a unit 6, with bits determined by the unit 6 being punctured in accordance with a prescribed scheme; that is to say, removed, repeated, or multiplied. The unit 6 alternatively can also be arranged upstream of the interleaver 5.

FIG. 2A represents a possible algorithm with the aid of which a non-uniform puncturing pattern can be achieved for the bits assigned to a frame to be transmitted. In this case, m denotes the position of the instantaneously considered bit $x_m$ in the respective frame, while N specifies the number of the bits of the frame. The algorithm evaluates a continuously updated error value e, which describes the error between the instantaneous puncturing rate and the desired puncturing rate. An individual error value e that is composed of the error value of the bit $x_{m-1}$, preceding in the corresponding frame, and an update parameter $e_{minus}/e_{plus}$ is calculated as follows for each bit $x_m$.

The error value e is first set to an initial error $e_{ini}$ in a step (1). This initial value usually has the value of 1 for the sake of simplicity. Subsequently, in a step (2), the index of the instantaneously considered bit is set to 1, and the sequence embedded in a WHILE loop (3) is executed. The error value is thereby updated for the bit $x_m$, the difference between the instantaneous error value and a prescribed first update parameter $e_{minus}$ being calculated therefor (step (4)). If the result is $e \leq 0$ (step (5)), the bit $x_m$ is punctured (step (6)) and the error value e is subsequently updated again, the instantaneous error value e being increased therefor by a prescribed second update parameter $e_{plus}$ (step (7)). Subsequently, in a step (8) the index of the considered bit is increased, and thus the WHILE loop for the next bit of the respective frame is traversed.

In this way, there is calculated for each bit $x_m$ of the frame an individual error value e that is composed of the error value calculated for the preceding bit $x_{m-1}$ or, in the case of m=1, of the initialization error $e_{ini}$ and the update parameters $e_{minus}$ and $e_{plus}$.

The algorithm shown in FIG. 2A and previously described is already known, in principle. In the case of the conventional algorithm, however, it is assumed that the parameters $e_{minus}$ and $e_{plus}$, are constant for the entire range of the frame; that is to say, the same parameter value $e_{minus}$ and $e_{plus}$ is used to calculate the error value e for each bit $x_m$.

However, it is proposed within the scope of the present invention not to keep the parameters $e_{minus}$ and $e_{plus}$ constant for the entire range of the frame, but to vary them. In the most extreme case, each individual bit $x_m$ can be assigned an individual value $e_{minus}(x_m)$ and/or $e_{plus}(x_m)$. It is likewise conceivable that the bits are combined to form specific groups, the same parameter values being assigned to the bits within a group, while the parameter values differ from group to group. Thus, for example, the first ten bits, the next 20 bits, etc., can form such a group.

Since the puncturing density depends on the parameters $e_{minus}$ and $e_{plus}$, the puncturing can be controlled individually in this way, and a non-uniform puncturing can thereby be achieved.

A corresponding algorithm for the case of a repetition of bits is represented in FIG. 2B. In order to explain the individual steps (1)–(8), the above statements relating to FIG. 2A may be referred to at this juncture by way of supplement. The repetition algorithm differs from the puncturing algorithm only in that, instead of the IF statement, a WHILE loop is provided such that the respective bit $x_m$ is repeated, and the error value e assigned to the bit $x_m$ is increased by $e_{plus}$ until the error value is greater than zero.

Variable bit-specific parameter values $e_{minus}(x_m)$ and $e_{plus}(x_m)$ are also used in accordance with the repetition algorithm shown in FIG. 2B, in order to achieve a non-uniform repetition density.

In order to carry out both puncturing and repetition in a single frame, use may be made of the algorithm shown in FIG. 3, in which case reference is made again to the above remarks relating to FIG. 2A and FIG. 2B, by way of supplement. The algorithm shown in FIG. 3 corresponds to a combination of the algorithms shown in FIG. 2A and FIG. 2B, there being executed in steps (5)–(7) a WHILE loop in which the corresponding bit $x_m$ is selected for transmission to a receiver, and the corresponding error value e is increased by $e_{plus}$ until the error value e assumes a value greater than zero. As such, the bit $x_m$ is not selected at all for transmission, and is therefore punctured if the error value e updated in step (4) is greater than zero. On the other hand, for the case that the error value e is less than or equal to zero after step (4), the bit $x_m$ is repeated precisely until the error value e can be increased by $e_{plus}$ until the value zero is reached.

In the case of the algorithm shown in FIG. 3, it is possible by varying the parameter $e_{minus}$ to control in which ranges bits are to be punctured and in which ranges bits are to be repeated. Puncturing generally takes place in those ranges where it holds that $e_{minus} < e_{plus}$ while, conversely, a repetition is carried out wherever it holds that $e_{minus} \geq e_{plus}$).

In the case of an AMR-coded transmission with, for example, a constant update parameter $e_{plus}$, the parameter $e_{minus}(x_m)$ can be selected to be relatively large for the more important class A bits, in order to achieve a repetition of these bits, while this parameter can be selected to be relatively small for the less important class B or class C bits, in order to achieve only a slight repetition, or even a puncturing. The signaling required therefor, that is to say the transmission of values, for the purpose of determining the parameters $e_{plus}(x_m)$ and/or $e_{minus}(x_m)$ or the ratio between the individual parameter values is no more complicated than the currently known solution, in which it is provided to send the bits of different classes in independent transport channels, for which the puncturing and repetition are carried out independently of one another. The only requirement is that after puncturing or repetition, the total number of the bits of all transport channels corresponds to the number of the bits available for the transmission. In the case of this mode of procedure, it is necessary to transmit for each class of bits its relative weight or a corresponding parameter that fixes whether a repetition or puncturing is applied for the respective class.

The parameters $e_{minus}$ and $e_{plus}$ can, for example, be fixed as follows, N denoting the number of bits per frame before the rate matching, $N_c$ the number of the bits per frame after the rate matching, and K a constant corresponding to the weighting described below:

$$e_{plus} = K$$

$$e_{minus} = w(x_m) * N_c$$

The parameter $w(x_m)$ individually determined for each bit $x_m$ corresponds to the weight of the respective bit $x_m$, in which case it holds that:

$$\sum_{m=1}^{N} w(x_m) = K.$$

Overall, the error value e is, therefore, increased and reduced by $K*N_c$. $w(x_m)$ denotes the weight that is assigned to the bit $x_m$; that is to say, the mth bit. This also can be expressed by w(m) in a simplified nomenclature. This expression can be applied to other variables correspondingly. Any desired number of bits to be transmitted can be set in this way.

To apply this principle to the previously mentioned tail puncturing, it is possible in this case to select the weights w such that the bits at the start and end of the frame are less strongly weighted than the bits in the middle. To this end, the weight w for the bits at the start and end of the frame is selected to be smaller than for the bits in the middle of the frame.

In a particularly advantageous refinement of this principle, w is selected to rise in a strictly monotonic fashion at the start, to be held constant in a middle part, and to fall in a strictly monotonic fashion at the end.

In the UMTS system, the rate matching is carried out in the uplink not directly after the coding, but only downstream of the first interleaver, which distributes the bits over the individual radio frames while one data frame is being transmitted. The number of these radio frames is called TTI in this case and is 1, 2, 4 or 8 in the UMTS system. The present invention also can be applied for this purpose, since the weights w also can be used then. A particularly simple implementation is possible in this case whenever the weight distribution is identical in all TTI radio frames. This can be achieved by allocating the same weight in each case to blocks of TTI consecutive bits. This is possible, in particular, whenever the same weight is allocated in each case to blocks of 8 consecutive bits, since 8 can be divided by every possible value of TTI.

The bit error rate that can be achieved via this principle has been investigated with the aid of complex simulations. It has emerged in this case that the following pattern is particularly advantageous for rate 1/3 coding:

{1,1,1,1,1,1,1,1,2,2,2,2,2,2,2,2,4, . . . ,4,2,2,2,2,2,2,2,1, 1,1,1,1,1,1,1} that is to say w(m)=1 for the first and last 8 bits,. w(m)=2 for bits No. 9–16 calculated from both ends, and $w_s$(m)=4 otherwise. This pattern can be implemented easily in all cases and exhibits a good performance.

The following pattern has proved to be particularly advantageous for rate 1/2 coding:

{1,1,1,1,1,1,1,4 . . . ,4,1,1,1,1,1,1,1,1};

that is to say w(m)=1 for the first and last 8 bits, and $w_s$(m)=4 otherwise.

In this case, the pattern for rate 1/2 is a part of the pattern for rate 1/3, which also simplifies the outlay on implementation when both coding rates are implemented.

The parameter q is defined in 3G TS 25. 212 V3. 2. 0 (2000–03); Technical Specification; 3rd Generation Partnership Project; Technical Specification Group Radio Access Network; Multiplexing and channel coding (FDD); (Release 1999): Chapter 4.2.7 Rate matching:

q: Average puncturing or repetition distance (normalized to only show the remaining rate matching on top of an integer number of repetitions). Used in uplink only.

This parameter denotes the average puncturing or repetition distance, the average being calculated over the entire frame. As a result of this, the puncturing patterns that are applied for the individual radio frames are optimally shifted relative to one another.

However, when applying the present invention, this parameter should be calculated only over the middle part with a constant puncturing or repetition rate.

It follows for the above-named pattern that p is not calculated as:

$R=\Delta N_{ij}$ mod $N_{ij}$—note: in this context $\Delta N_{ij}$ mod $N_{ij}$ is in the range of 0 to $N_{ij}$–1 i.e. –1 mod 10=9.

if R≠0 and 2R≦$N_{ij}$
   then q=⌈$N_{ij}$/R⌉
   else
   q=⌈$N_{ij}$/(R–$N_{ij}$)⌉
   endif
   —note: q is a signed quantity.

but as $R=(\Delta N_{ij}+T)$ mod $(N_{ij}-T)$—note: in this context $\Delta N_{ij}$ mod $N_{ij}$ is in the range of 0 to $N_{ij}$–1 i.e. –1 mod 10=9.

if R≠0 and 2R≦$N_{ij}$
   then q=⌈$(N_{ij}-T)/R$⌉
   else
   q=⌈$(N_{ij}-T)/(R-(N_{ij}-T))$⌉
   endif
   —note: q is a signed quantity.

T is thereby the effective number of the additionally punctured bits (or fewer sent bits) at both ends, and can be calculated as $$T = N_{ij} - \Sigma_{i=1}^{N_{ij}}(w(i))/w_0$$

$w_0$ being the weight of a bit in the middle (the range where the weights are constant).

The present invention was described previously with reference to use in a mobile radio transmitter. Of course, however, the present invention also can be extended to mobile radio receivers, where it is necessary to condition a signal, punctured or repeated for matching the bit rate in the way described above, in accordance with the respectively used puncturing or repetition scheme. In this case, additional bits are inserted in the respective receiver for bits punctured or repeated at the transmitting end into the receive bit stream, or two or more bits of the receive bit stream are combined. When additional bits are being inserted, it is noted for these simultaneously in the form of what is termed soft decision information that their information content is very uncertain. The processing of the received signal can be performed in the respective receiver mutatis mutandis in the reverse sequence to FIG. 1.

Although the present invention has been described with reference to specific embodiments, those of skill in the art will recognize that changes may be made thereto without departing from the spirit and scope of the invention as set forth in the hereafter appended claims.

The invention claimed is:

1. A method for matching a bit rate in a communication device, the method comprising the step of:

performing matching of the bit rate by one of puncturing and repeating bits of a bit stream, wherein specific bits of the bit stream are removed when puncturing and being multiplied when repeating;

determining for each bit of the bit stream an updated error value that is a measure of deviation between an instantaneous puncturing or repetition rate and a desired puncturing or repetition rate, respectively, within the bit stream, based in a corresponding error value, already determined previously, and at least one variable, bit-specific update parameter; and making a judgement based in the updated error value as to whether the corresponding bit is to be punctured or repeated or not.

2. A method for matching a bit rate in a communication device as claimed in claim 1, wherein the bits of the bit stream are combined in frames, and use is respectively made of a variable update parameter dependent on a position of the respective bits in the frame to determine the updated error value of the individual bits of the frame.

3. A method for matching a bit rate in a communication device as claimed in claim 1, wherein the bits are assigned to specific bit groups, with a same update parameter being used to determine the updated error value of the individual bits of a bit group.

4. A method for matching a bit rate in a communication device as claimed in claim 1, wherein the updated error value of each bit is determined from the difference between the corresponding already previously determined error value and a first update parameter, and for the case that the determined updated error value is not greater than a specific reference value, the corresponding bit is punctured and the determined updated error value is updated again by forming a sum with a second update parameter.

5. A method for matching a bit rate in a communication device as claimed in claim 1, wherein the updated error value of each bit is determined from the difference between the corresponding already previously determined error value and a first update parameter, and for the case that the updated error value is not greater than a specific reference value, the corresponding bit is repeated, and the updated error value updated again by forming a sum with a second update parameter until the error value resulting therefrom is greater than the reference value.

6. A method for matching a bit rate in a communication device as claimed in claim 1, wherein the updated error value of each bit is determined from the difference between the corresponding already previously determined error value and a first update parameter, and for the case that the updated error value is not greater than a specific reference value, the corresponding bit is selected for transmission by the communication device to a receiver, and the updated error value is updated again by forming a sum with a second update parameter until the error value resulting therefrom is greater than the reference value.

7. A method for matching a bit rate in a communication device as claimed in claim 4, wherein the reference value is zero.

8. A method for matching a bit rate in a communication device as claimed in claim 4, wherein at least one of the first update parameter, used for determining the updated error value of each bit, and the second update parameter is variable and selected in a bit-specific fashion.

9. A method for matching a bit rate in a communication device as claimed in claim 8, wherein the second update parameter is selected in a bit-specific fashion as $e_{minus}=w*N_c$, $N_c$ being a number of bits per frame after the rate matching, and the weights w being variable and selected in a bit-specific fashion.

10. A method for matching a bit rate in a communication device as claimed in claim 9, wherein the weights w for bits at both ends of the frame are selected to be smaller than for bits in a middle of the frame.

11. A method for matching a bit rate in a communication device as claimed in claim 9, wherein the weights w for TTI consecutive bits are selected to be equal, TTI being a number of radio frames over which the bits of a data frame are distributed.

12. A method for matching a bit rate in a communication device as claimed in claim 9, wherein the weights w are equal to 1 for the first and last 8 bits, equal to 2 for bits 9–16 calculated from both ends, and otherwise equal to 4.

13. A method for matching a bit rate in a communication device as claimed in claim 9, wherein the weights w are selected to be equal to 1 for the first and last 8 bits, and otherwise to be equal to 4.

14. A method for matching a bit rate in a communication device as claimed in claim 9, wherein the distribution of the update parameters or the weight distribution is selected as a function of a coding rate.

15. A method for matching a bit rate in a communication device as claimed in claim 9, wherein an average puncturing or repetition distance, which for purposes of determining an optimum relative displacement of the puncturing patterns in individual radio frames is determined, is determined not from an average over the entire frame, but from an average over a range in which the update parameters or weights w of the bits have a constant value.

16. A communication device comprising:
a bit rate matching device for matching a bit rate by puncturing or repetition of bits of a supplied bit stream, for removing specific bits from the bit stream for puncturing purposes and multiplying specific bits in the bit steam for repetition purposes;
a means for determining for each bit an updated error value based on a corresponding already previously determined error value and at least one variable, bit-specific update parameter; and
a means for making a judgement using the updated error value as to whether the corresponding bit is to be punctured or repeated or not.

17. A communication device as claimed in claim 16, wherein the communication device is a UMTS mobile radio transmitting device.

18. A communication device as claimed in claim 16, wherein the communication device is a UMTS mobile radio receiving device.

* * * * *